F. K. VREELAND.
SELECTIVE RECEIVING SYSTEM FOR RADIANT ENERGY.
APPLICATION FILED MAR. 22, 1916.
1,315,584.
Patented Sept. 9, 1919.
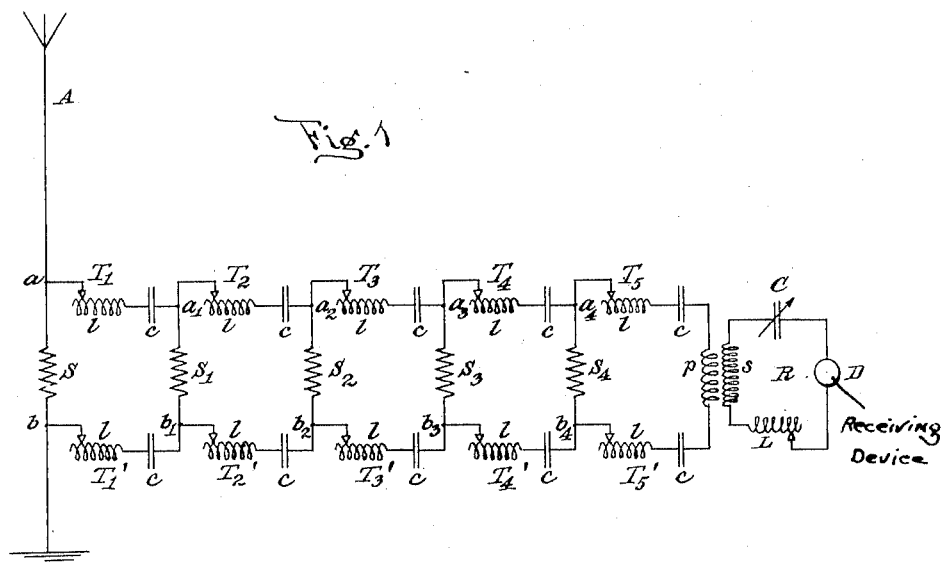
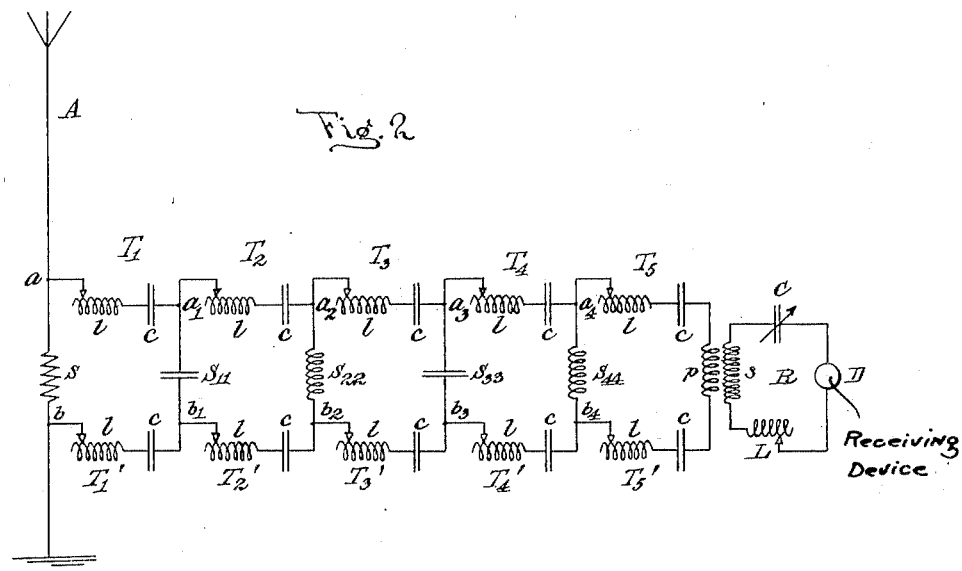
Witnesses:
Inventor
Frederick K. Vreeland,
by Frank L. Dyer
Attorneys.

UNITED STATES PATENT OFFICE.

FREDERICK K. VREELAND, OF MONTCLAIR, NEW JERSEY, ASSIGNOR TO VREELAND APPARATUS COMPANY, A CORPORATION OF NEW YORK.

SELECTIVE RECEIVING SYSTEM FOR RADIANT ENERGY.

1,315,584. Specification of Letters Patent. Patented Sept. 9, 1919.

Application filed March 22, 1916. Serial No. 85,773.

*To all whom it may concern:*

Be it known that I, FREDERICK K. VREELAND, a citizen of the United States, residing in Montclair, county of Essex, State of New Jersey, have invented a certain new and useful Selective Receiving System for Radiant Energy, of which the following is a specification.

The invention herein described has for its object the improvement of the selectivity of receiving systems for radiant energy, and particularly the prevention of interference by atmospheric disturbances or "static" effects.

It is well known that the ordinary receiving antenna in itself has a relatively small power of selectivity. The selectivity of a receiving system as regards interfering signals of definite frequency may be considerably improved by associating a tuned resonant system with the antenna, but this is not effective for eliminating atmospheric disturbances because of their peculiar character. These disturbances are usually either strongly damped or aperiodic and it is well known that damped impulses of this type will set a resonant circuit in vibration, no matter what its natural frequency may be, within wide limits. The suddenly applied potential difference sets the oscillating circuit into vibration at its own natural frequency.

The present invention removes this difficulty by the use of a composite baffling circuit having a plurality of by-pass circuits through which the disturbing impulses are shunted off, so that their potential differences are not applied to the receiving circuit. These shunts or by-pass circuits are applied to the baffling circuit at points of minimum potential difference of the signal oscillations and they are so constructed that the signal energy is not materially diminished.

In order that my invention may be better understood, attention is directed to the accompanying drawing forming a part of this specification and in which:

Figure 1 is a diagram of an apparatus embodying my invention, and

Fig. 2, corresponding view of a modification to be hereinafter referred to.

One form of apparatus embodying the invention is shown in Fig. 1. $T_1$, $T_1^1$, $T_2$, $T_2^1$, $T_3$, $T_3^1$, etc., are tuned elements, each comprising an inductance $l$ and a capacity $c$. The inductance and capacity of each element are so proportioned that their reactances are equal at the frequency which it is desired to receive. The impedance of each element therefore at the signal frequency is due simply to the resistance and other losses in the elements. At any other frequency, however, the impedance is relatively high.

These separately tuned elements are connected in series with each other in such manner as to be traversed by the received signal impulses, and together they constitute the baffling circuit. This may be inserted directly in the antenna circuit, as shown in the drawing, or included in a circuit associated with the antenna circuit in any of the well known ways. The transformer $p$, $s$, or other suitable coupling means transfers the received signal energy from the baffling circuit to a resonant receiving circuit R. This receiving circuit includes the usual capacity C, inductance L, and receiving or translating device D, the capacity and inductance being adjustable in the ordinary way.

The composite circuit $T_1$, $T_1^1$, $T_2$, $T_2^1$, etc., is traversed readily by impulses of the frequency for which it is tuned, at which frequency its impedance is made as low as practicable. At any other frequency, however, each element $T_1$, etc., has an unbalanced reactance. Each tends, therefore, to baffle the flow of all except the desired signal impulses.

At points $a_1$, $b_1$, $a_2$, $b_2$, $a_3$, $b_3$, $a_4$, $b_4$, between the successive baffle elements are connected shunts or by-pass elements $S_1$, $S_2$, $S_3$, and $S_4$, to carry away any foreign impulses which may succeed in passing the baffle elements. When the baffle circuit is connected in the antenna circuit it is desirable to insert also a shunt S at the points $a$, $b$.

At the signal frequency the points $a_1$, $b_1$, $a_2$, $b_2$, etc., are points of minimum potential difference; hence the tendency to leakage of signal energy through the shunts will be small. In order to reduce such leakage still further the impedance of each shunt should be made large with respect to the equivalent resistance of that part of the baffle circuit which it bridges. Thus the impedance of the shunt S should be large with respect to the total equivalent resistance of the baffle circuit; the impedance of the shunt $S_1$ should be large with respect to the equivalent resistance of that part of the baffle circuit excluding the elements $T_1$, $T_1^1$, etc. Preferably the impedance of each shunt should, bear a fixed relation to the equivalent resistance of the shunted portion of the baffle circuit. The impedance of each shunt should, however, be small with respect to the unbalanced reactance of the shunted portion of the baffle circuit at the nearest frequency that it is intended to eliminate. The best results are obtained when the inductance and capacity reactances of the units, $l$ and $c$, respectively, are made large with respect to the impedance of the shunts, and the equivalent resistances of these elements small. To secure the best results the aggregate unbalanced reactance of all the tuned elements, at the nearest frequency that it is desired to eliminate, should be large with respect to the "radiation resistance" of the antenna.

Inasmuch as the points $a_1$, $b_1$, $a_2$, $b_2$, etc., are points of small potential difference at the signal frequency, the shunting of signal energy at this frequency will be small, being inversely proportional to the ratio of the impedance of the shunt to the equivalent resistance of the shunted portion at the baffle circuit. At any foreign frequency, however, the impedance of the shunt will be small with respect to the impedance of the baffle circuit and the greater part of the foreign impulses will be shunted. Inasmuch as each by-pass shunts the major part of the disturbing impulses that reach it, the aggregate result of a plurality of such by-passes is to practically eliminate the disturbance. Since each by-pass shunts only a small fraction of the signal energy that reaches it, the aggregate loss of signal energy from such shunting will be small.

The by-pass elements $S$, $S_1$, $S_2$, etc., may be simple resistances, as shown in Fig. 1, in which case they will be non-selective in their shunting action. For certain purposes, however, they may be made with either inductance or capacity. In the former case they will tend to shunt principally impulses whose frequency is lower than the signal frequency and in the latter case they will tend to shunt impulses whose frequency is higher than the signal frequency. In certain cases shunts may be employed comprising alternately an inductance element and a capacity element, in which case frequencies above and below the signal frequency will be shunted. Thus, referring to Fig. 2, I show the first and third by-pass elements as including condensers S11 and S33, and the second and fourth by-pass elements as including inductances S22 and S44, but obviously, as above explained, the several by-pass circuits may all include condensers or may all include inductances. For eliminating aperiodic disturbances, however, the simple resistance shunt is usually preferable.

What I claim is:

1. In a receiving system for radiant energy, a baffle circuit so tuned as to transmit a single signal frequency, a by-pass shunting the baffle circuit at points of minimum potential difference at the signal frequency, the impedance of the by-pass being large with respect to the equivalent resistance of the shunted portion thereof at the signal frequency, and a receiver combined with the baffle circuit to be influenced by the signal frequency transmitted thereby.

2. In a receiving system for radiant energy, a baffle circuit so tuned as to transmit a single signal frequency, a non-reactive by-pass shunting the baffle circuit at points of minimum potential difference at the signal frequency, said by-pass having an equivalent resistance large with respect to the equivalent resistance of the shunted portion of the baffle circuit at the signal frequency, and a receiver combined with the baffle circuit to be influenced by the signal frequency transmitted thereby.

3. In a receiving system for radiant energy, a baffle circuit so tuned as to transmit a single signal frequency, a by-pass shunting the baffle circuit at points of minimum potential difference at the signal frequency, the impedance of the by-pass being large with respect to the equivalent resistance of the shunted portion thereof at the signal frequency but small with respect to the equivalent impedance at any other frequency, and a detector combined with the baffle circuit to be influenced by the signal frequency transmitted thereby.

4. In a receiving system for radiant energy, a baffle circuit so tuned as to transmit a single signal frequency, a non-reactive by-pass shunting the baffle circuit at points of minimum potential difference at the signal frequency, said by-pass having an equivalent resistance large with respect to the equivalent resistance of the shunted portion of the baffle circuit at the signal frequency but small with respect to the equivalent impedance for strays and a receiver combined with the baffle circuit to be influenced by the signal frequency transmitted thereby.

5. In a receiving system for radiant energy, a baffle circuit comprising a plurality of selective elements, each tuned to the signal frequency and connected in series with respect to the signal impulses, a plurality of by-pass elements shunting progressively diminishing portions of the baffle circuit at points of small potential difference at the signal frequency, the impedance of each by-pass being large with respect to the equivalent resistance of the shunted portion.

6. In a receiving system for radiant energy, a baffle circuit comprising a plurality of selective elements, each tuned to the signal frequency and connected in series with respect to the signal impulses, a plurality of by-pass elements shunting progressively diminishing portions of the baffle circuit at points of small potential difference at the signal frequency, the impedance of each by-pass being large with respect to the equivalent resistance of the shunted portion, and a receiving or translating device associated with the shunted portion.

7. In a receiving system for radiant energy, a collecting circuit, a baffle circuit associated therewith, comprising a plurality of selective elements individually tuned to the same frequency and having an aggregate unbalanced reactance at foreign frequencies which is large in relation to the radiation resistance of the collecting circuit and a small impedance at the frequency to be received, a receiving or translating device associated with this circuit at a point remote from the point of association with the receiving circuit, and a plurality of by-pass elements shunting the portion of this circuit including the receiver at points progressively distant from the collecting circuit and each adapted to shunt a large part of such foreign impulses as may reach it excepting impulses of a single signal frequency, but only a small part of impulses at the desired frequency.

8. The method of receiving radiant energy of a single signal frequency to the exclusion of extraneous energy of different wave characteristics due to strays, which consists in receiving the combined wave energy in a suitable collecting circuit, in diverting and absorbing impulses of other than the single signal frequency, permitting the unimpeded flow of impulses of the single signal frequency in the circuit and in causing the energy of single signal frequency thus separated from the strays to influence a receiver.

9. The method of selectively receiving radiant energy which consists in diverting from the receiving system and absorbing a material part of the stray energy while permitting the unimpeded flow of the major portion of the signal energy of a single definite signal frequency, again diverting and absorbing a material part of the remaining stray energy and repeating these operations until the stray energy is practically eliminated.

This specification signed and witnessed this eighteenth day of March, 1916.

FREDERICK K. VREELAND.

Witnesses:
ANNA E. RENTON,
BERNARD CLANCEY.